United States Patent [19]

Mitchel

[11] 4,122,729

[45] Oct. 31, 1978

[54] OPERATION INITIATOR

[76] Inventor: Stanley Mitchel, 189 Farview Ave., Paramus, N.J. 07652

[21] Appl. No.: 756,913

[22] Filed: Jan. 4, 1977

[51] Int. Cl.[2] .............................................. F16H 27/02

[52] U.S. Cl. ...................................... 74/128; 194/1 G

[58] Field of Search ................... 74/29, 128; 194/1 G, 194/DIG. 2

[56] References Cited

U.S. PATENT DOCUMENTS

| | | | |
|---|---|---|---|
| 1,421,571 | 7/1922 | Rodger | 74/29 |
| 2,038,963 | 4/1936 | Seeburg | 194/1 G |
| 3,990,318 | 11/1976 | Cahoe et al. | 74/128 |

*Primary Examiner*—Benjamin W. Wyche
*Assistant Examiner*—Wesley S. Ratliff, Jr.
*Attorney, Agent, or Firm*—Philip H. Gottfried

[57] ABSTRACT

An apparatus is provided for initiating the operation of a device by requiring plural actuations of a coin-controlled reciprocating operating handle. A rail, which includes a pawl affixed thereto, is reciprocated by the operating handle. A ratchet having a plurality of teeth is rotatably mounted on an operating shaft in operative relation to the pawl. An operation-initiating disc member is fixed relative to the shaft and is coaxially mounted relative to the ratchet. The ratchet and the operation initiating disc member are constructed and arranged relative to each other and relative to the pawl so that successive engagements of teeth on the ratchet by the pawl results in eventual rotation of the operation initiating disc member and consequent rotation of the shaft with respect to which it is fixed thereby initiating operation of the device to which the shaft is affixed. By selectively changing the value of the angle of unrestricted rotation possible between the ratchet and the operation initiating disc member, the number of actuations of the rail member required to commence the rotation of the shaft can be varied.

7 Claims, 18 Drawing Figures

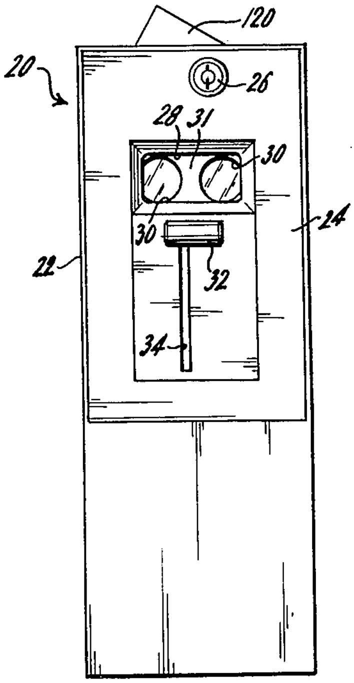
FIG. 1.
FIG. 3.
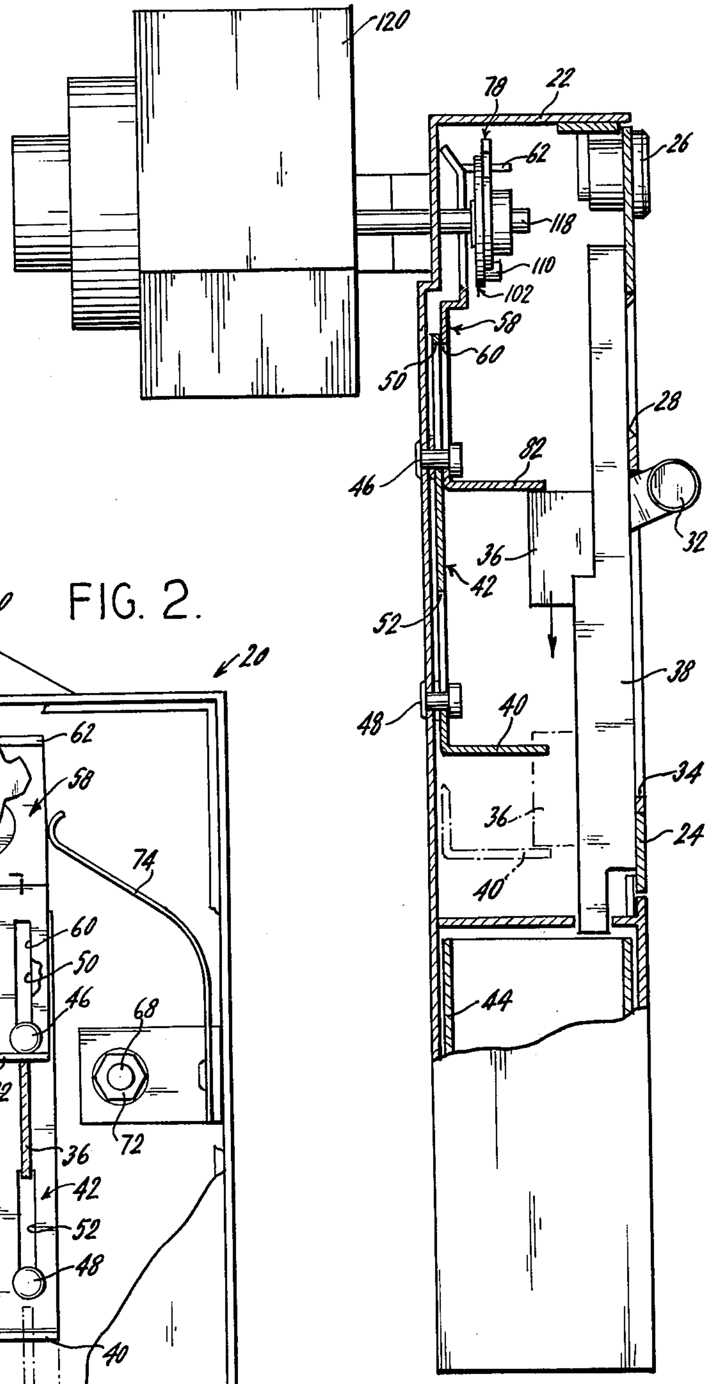
FIG. 2.
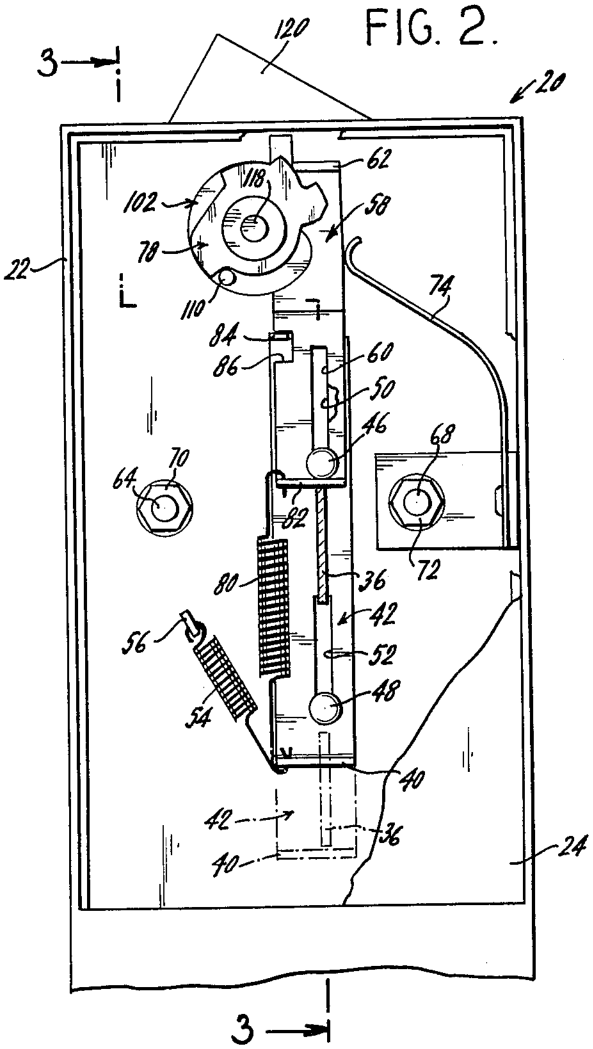

FIG. 4.
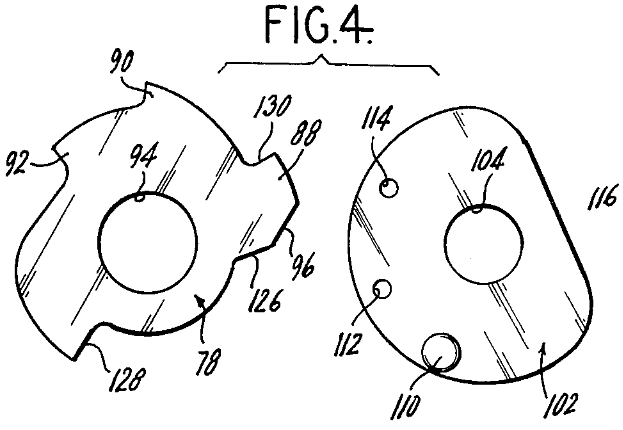
FIG. 5.
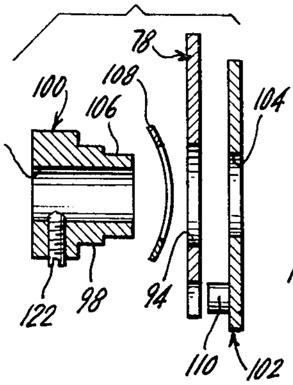
FIG. 6.
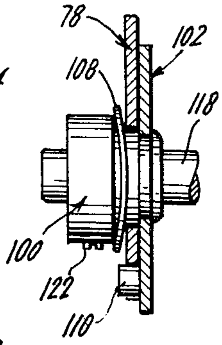
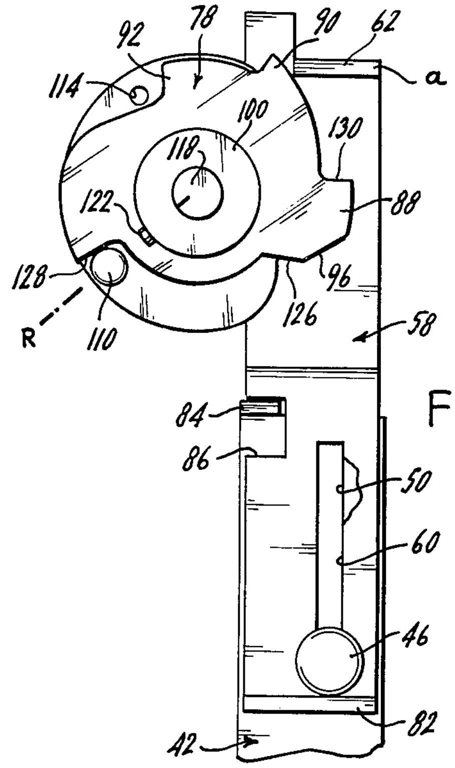
FIG. 7.
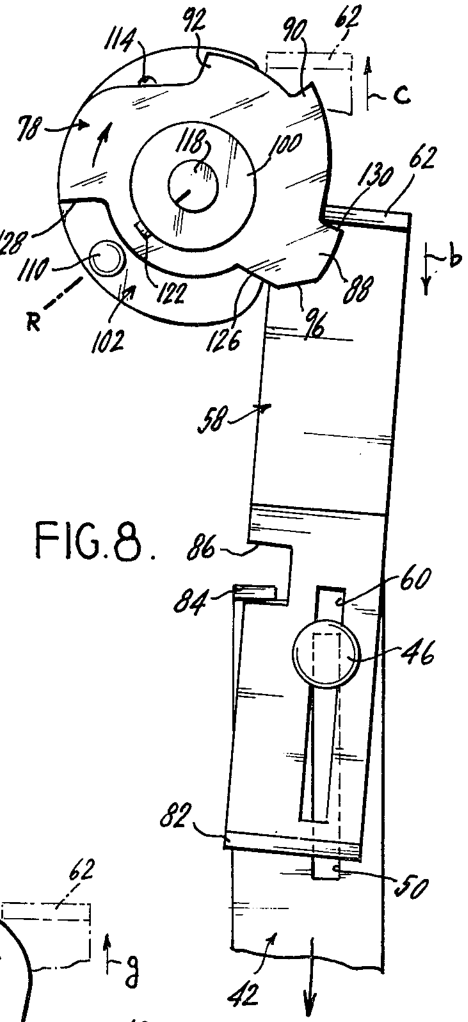
FIG. 8.
FIG. 9.
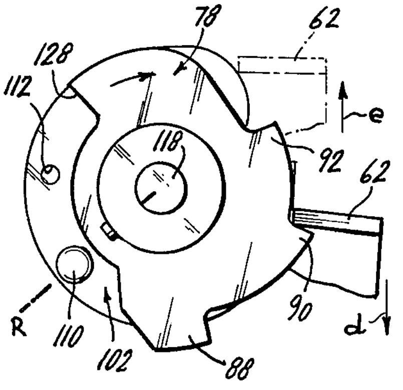
FIG. 10.
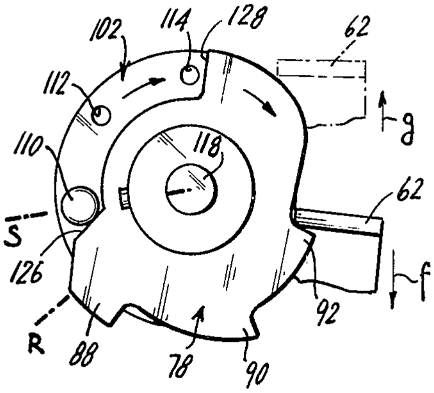

FIG. 11.
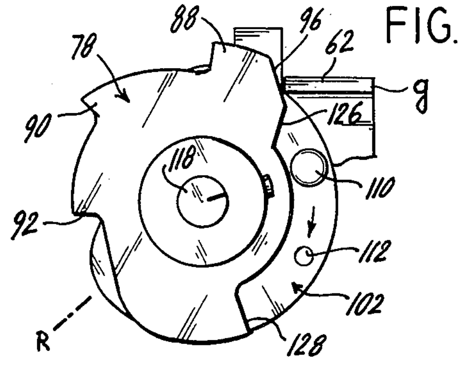
FIG. 12.
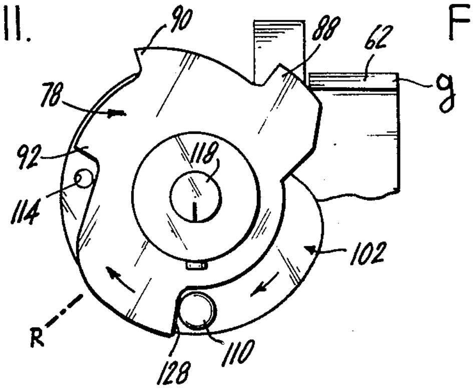
FIG. 13.
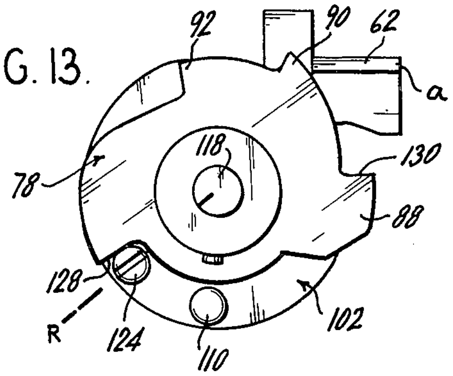
FIG. 14.
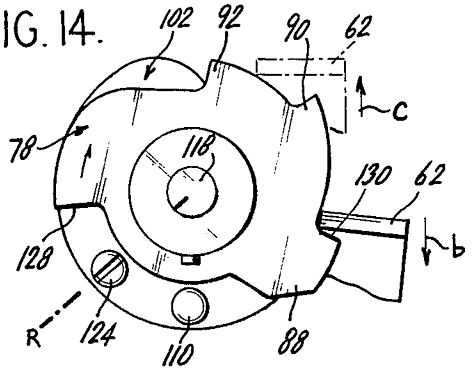
FIG. 15.
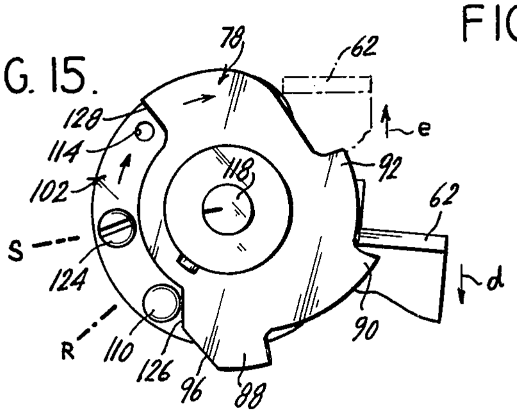
FIG. 16.
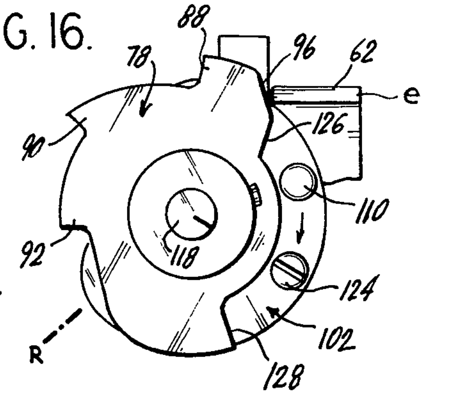
FIG. 17.
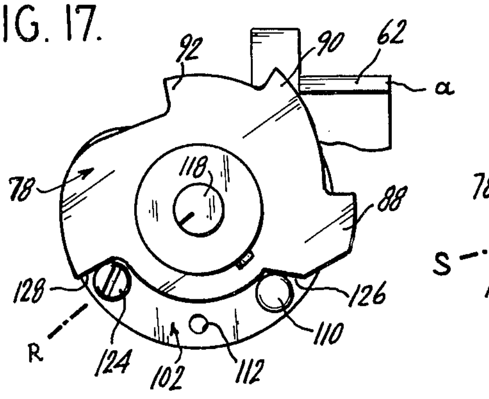
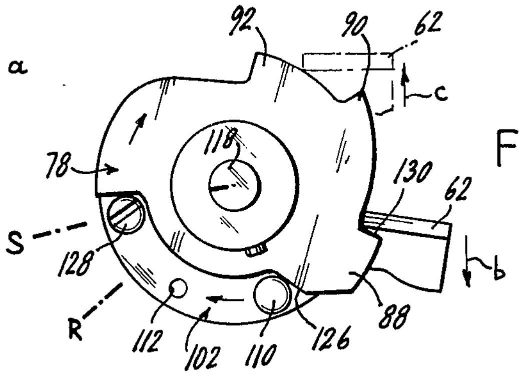
FIG. 18.

OPERATION INITIATOR

The present invention relates generally to an operation initiator and, in particular, to an apparatus for selectively choosing the number of strokes of a reciprocating member which are required to initiate rotation of an operating shaft.

In numerous applications, a reciprocating member is actuated at least once to initiate rotation of a shaft or other member affixed to an operating member. For example, in devices such as ticket dispensing apparatuses, coin-operated automatic record players, coin-operated electrically timed devices of all sorts including games, coin-operated washing machines and dryers, coins are inserted and permit reciprocation of an operating handle which, upon complete operation thereof, either dispenses a ticket or starts a motor or timing apparatus. Typically, coins are inserted into a slide member which includes one or more circular openings therein of appropriate diameter depending upon the size of the coin to be inserted. A handle member attached to the slide member can then be moved and, through appropriate interconnection, initiates rotation of a shaft attached to a timer or to a motor, either directly or through a switch member.

As costs of operation and costs of materials and labor have risen, it has become necessary to take single-coin-receiving slide members in such coin-operated apparatuses and substitute therefor coin-receiving slides with two or more openings therein. In view of the fact that most coin-receiving apparatuses have had to include a restricted size coin-receiving window therein in order to prevent removal of inserted coins from the apparatus once the coins have been inserted and movement of the coin slide initiated, a limit has been placed on the number of coin-receiving openings which can be placed within the coin slide and still remain accessible through the coin-receiving window without extensive and consequently expensive modification thereof.

Devices have been well known in the art for many years which prevent partial actuation and reversal of an operating handle affixed to the coin-receiving slide. The purpose of such devices is to prevent movement of the coin-receiving slide in the opposite direction and removal of the coins. Such pre-existing and well-known apparatus typically requires full-stroke actuation of the operating handle before it can be returned to receive additional coins. This feature has prevented modification of existing coin-receiving slides to permit lineal location of coin-receiving openings therein through a limited-size coin-receiving window.

In order to permit modification of existing coin-operated machines at any where near a profitable return with increasing material and labor costs, it has been necessary to devise means for requiring multiple operations of a reciprocable actuation member prior to initiating the operation of an operating member thereby.

Among the solutions which have been attempted to obtain operation of an operating member only upon multiple actuations of a reciprocable initiating member have been combinations of mechanical and electrical switches which include complicated and expensive counting mechanisms therein. Often, expensive difficult to maintain and assemble cams and cam followers have been arranged in combination with electrical switches to count the number of actuations of a reciprocable member prior to initiating rotation of an actuating member such as the shaft of a timer mechanism. In view of the expense, delicacy of adjustment and consequent potential for misadjustment and malfunctioning, such attempted solutions have been less than satisfactory.

It would be highly desirable to have available an apparatus whereby multiple operation of a reciprocable member could be utilized to initiate rotation of a shaft connected in operative relation to a device, such as a timing mechanism which is desired to be operated and which would be operated only upon operation of the reciprocable member for a specified number of complete actuations. In accomplishing such an operation-initiating function only in response to a controlled number of actuations of the reciprocable member, the apparatus should be simple to install and maintain and should be able to be installed in existing coin-operated apparatuses with a minimum of modification thereto. In addition, such apparatus should be economical to manufacture and should be sufficiently reliable and non-complicated to permit continuous operation thereof over an extended period of time without the need for maintenance of any but the most routine sort.

Broadly, it is an object of the present invention to provide an apparatus for control of the initiation of an operation based upon the occurrence of a predetermined number of actuations of a reciprocable member which realizes one or more of the aforesaid objectives. Specifically, it is within the contemplation of the present invention to provide an operation initiating mechanism which utilizes a single, reciprocable member which actuates a first, preliminary operation initiating member a predetermined number of times before an operation initiating member is moved thereby to initiate operation of the desired mechanism.

It is a further object of the present invention to provide an apparatus and method for initiating the operation of a mechanism in response to a predetermined number of actuations of a reciprocable actuation initiator wherein the number of actuations of said reciprocable actuation initiator necessary to commence operation of the apparatus can be quickly and easily changed from two to three or more actuations with relative ease and simplicity and without the need for utilization of complicated apparatus or machinery.

It is a still further object of the present invention to provide an apparatus for selectively controlling the initiation of the operation of an operating mechanism which can be constructed with minimal modification of existing operation initiating mechanisms and which satisfies the practical requirements for such equipment including ease of assembly and disassembly of the existing mechanisms and facility of maintenance coupled with dependability, simplicity of design and economy of construction and operation.

In accordance with an illustrative embodiment demonstrating the object and features of the present invention, there is provided a reciprocable actuation initiator which is mounted for movement toward and away from a given location, in a single plane. A preliminary operation initiation or translating member includes a plurality of operating teeth thereon and is mounted for rotation about an operating initiation shaft with the teeth in operative relation to a pawl of the reciprocable actuation initiator. An operation initiating member is fixed relative to the shaft and is coaxially mounted relative to the preliminary operation initiation member and is constructed and arranged relative to the reciprocable actuation initiator and the pawl thereof to prevent contact thereof by the pawl during reciprocation of the reciprocable actuation initiator. The reciprocable actuation initiator and particularly the pawl thereof, the preliminary operation initiation member and the operation initiating member are all mounted, constructed and arranged relative to each other so that actuation of the reciprocable actuation initiator rotates the preliminary operation initiation member a given number of degrees for each contact of a tooth thereof by the pawl. The preliminary operation initiation member and the operation initiating member are constructed and arranged relative to each other to cause the operation initiating member to rotate only upon the preliminary operation initiation member rotating a second larger number of degrees relative thereto upon the operation initiating member being in its rest position. The operation initiating member and the preliminary operation initiation member include means being constructed and arranged for permitting adjustability of the permissible non-operation initiating rotation of the preliminary operation initiation member prior to contact thereby of the operation initiating member and rotation thereof in response to the actuation of the reciprocable actuation initiator.

The above description, as well as further objects, features and advantages of the present invention will be more fully understood and appreciated by reference to the following detailed description of the presently preferred but nonetheless illustrative embodiment in accordance with the present invention, when taken in conjunction with the accompanying drawing, wherein:

FIG. 1 is a front elevational view of an operation initiating mechanism container including the apparatus of the present invention contained therein;

FIG. 2 is an enlarged fragmentary front elevational view of the container of FIG. 1 with parts broken away and shown in section;

FIG. 3 is a sectional elevational view taken substantially along the line 3—3 of FIG. 2 and looking in the direction of the arrows;

FIG. 4 is an enlarged elevational view of the operation translating and operation initiating members of the subject invention shown disassembled;

FIG. 5 is an enlarged exploded right side sectional elevational view of the operation translating and operation initiating members of the subject invention including a tension washer and mounting hub;

FIG. 6 is an enlarged partial sectional side elevational view of the members of FIG. 5 shown assembled on a timer shaft;

FIG. 7 is an enlarged fragmentary front elevational view of lower and upper operating rails of the subject invention, shown in their normal or rest positions, and shown in operative relation to assembled translating and initiating members with the translating and initiating members arranged for initiation of operation of the timer shaft only upon three reciprocations of the upper rail, prior to the first reciprocation thereof, with the translating and initiating members in their normal or rest position;

FIG. 8 is a view similar to FIG. 7 with the first reciprocation of the upper rail having occurred;

FIG. 9 is an enlarged and even more fragmentary front elevational view, similar to FIG. 8, wherein just the translating and initiating members and the upper rail (in particular the pawl thereof) are shown, with the second reciprocation of the upper rail having occurred;

FIG. 10 is a view similar to FIG. 9 after the third reciprocation of the upper rail having occurred, thereby rotating the timer shaft from the rest to the start position;

FIG. 11 is a view similar to FIG. 10 showing the timer shaft having rotated through approximately 190° of a complete 360° cycle and showing the translation member being partially restrained against movement by the pawl of the upper rail while the initiating member rotates therebeneath;

FIG. 12 is a view similar to FIG. 11 showing the translation member rotated, having overcome the holding force of the pawl as a result of an upstanding stud member on the initiating member forcing rotation thereof against the pawl, prior to the return thereof to the rest position shown in FIG. 7;

FIG. 13 is a view similar to FIG. 9 with the translating and initiating members being constructed and arranged for rotation of the operating shaft upon two operations of the upper rail, with the translating and initiating members shown in their normal or rest positions, the upper rail being shown prior to contact of the first tooth of the translating member thereby;

FIG. 14 is a view similar to FIG. 13 with the upper rail shown having been operated once and contacted the first tooth of the translating member and rotated it;

FIG. 15 is a view similar to FIG. 14 with the upper rail having been operated a second time, having contacted the second tooth of the translating member and the upstanding stud member having caused rotation of the initiating member from the rest to the start position;

FIG. 16 is a view similar to FIG. 15 with the timer shaft having rotated through approximately 190° of a complete 360° cycle and the translating member being restrained against rotation by contact with the pawl during rotation of the initiating member therebeneath;

FIG. 17 is a view similar to FIG. 16 with the translating and initiating members being fixed relative to each other and constructed and arranged for rotation of the timer shaft upon a single operation of the upper rail member; and, FIG. 18 is a view similar to FIG. 17 subsequent to the single operation of the upper rail member causing rotation of the timer shaft.

Referring now specifically to the drawing, and first to FIG. 1, in accordance with an illustrative embodiment demonstrating objects and features of the present invention, there is shown a container which houses an operation initiating mechanism and coin-receipt container with the container being generally designated by the reference numeral 20. The container 20 includes a case 22 which is affixed vertically to the side of an automatic washing machine or clothes dryer, not shown.

While it is to be understood that the presently preferred illustrative embodiment of the present invention is described in connection with an automatic washing machine, the present invention is applicable to numerous different specific uses wherein multiple operations of an actuating member are desired before operation of a given apparatus is initiated.

A removable cover 24 is mounted on the front of the case 22 and is secured against unauthorized removal therefrom by a lock 26 of conventional design. A coin-receiving window 28 appears within the cover 24 and two coin-receiving openings 30 appear within a coin-receiving and advancing slide 31 with the coin-receiving windows being visible and accessible through the coin-receiving window when the coin-receiving and advancing slide 31 is in its normal or first position as shown in FIG. 1.

An operating handle 32 protrudes through an operating slot 34 within the cover 24 and is reciprocable therein. An operating arm 36 (see FIG. 3) is operatively connected to the operating handle 32.

As noted hereinbefore, coin-operated mechanisms are well known wherein operation of an actuating member for the length of its entire stroke is required before the actuating member can be moved through its entire operation and be returned in the opposite direction to its start position. The purpose of the travel through the complete first stroke before return to the start position is to prevent initiation of the operation of a device prior to release of operating coins into a coin receptacle.

Located within a single direction housing 38 is apparatus well known in the prior art for ensuring that, once coins of the appropriate denomination are inserted through coin-receiving window 28 into coin-receiving openings 30 within the coin-receiving and advancing slide 31 and the operating handle 32 is moved downwardly to contact an out-turned arm 40 of the lower rail member 42 in a manner to be described in detail hereinafter, the operating handle 32 and the operating arm 36 which is operatively connected thereto cannot be moved upwardly for subsequent contact with the lower rail member 42 until the coins inserted within the coin-receiving openings 30 have fallen into and have been collected by a coin-receiving box 44 (see FIG. 3).

In view of the well-known nature of the mechanism in the housing 38 for preventing unwanted and unauthorized return of the operating handle to its first or rest position, from its second or coin-discharge position (shown in phantom in FIG. 3) until the full downward travel of the handle 32 has been had, no further description of this mechanism is required.

As may be seen by reference to FIG. 2, the case 22 includes the lower rail member 42 which is reciprocably fixed within the container by upper and lower rivets 46, 48 which pass through, respectively, upper and lower longitudinally extending slots 50, 52 within the lower rail. The lower rail 42 is urged to its normal or first, upper position shown in FIG. 2 by a tension spring 54 which is fixed at one end to an opening in the out-turned arm 40 of the lower rail and at its other end to a hook 56 which protrudes upwardly from the base of the case 22.

An upper rail member 58 is mounted to the case 22 for reciprocation and limited pivoting movement relative thereto by the upper rivet 46 which passes through a rectangular slot 60 in the upper rail member. The upper rail member 58 includes an out-turned pawl 62 at its upper end for a purpose to be described hereinafter.

Left and right (when viewed facing the interior of the case 22 as seen in FIG. 2) mounting studs 64, 68 protrude from the washing machine to which the container 20 is mounted, and also protrude through openings in the base of the case 22. Left and right nuts 70, 72 are threaded on the left and right studs 64, 68, respectively, to maintain the container 20 firmly affixed to the washing machine.

An upper rail pressure spring 74, affixed to a base 76, is fixed within the case 22 through an opening within the base 76 which is passed over the stud 68 with the nut 72 being tightened thereover. The upper end of the spring 74 bears against the rightmost edge of the upper rail member 58 to maintain the pawl 62 urged counterclockwise to the left as seen in FIG. 2 with a pressure that is calculated to permit controlled movement of the upper rail member to the right a certain amount (compare the full line and phantom line representations of the upper rail member in, for example, FIGS. 8 and 9) for a purpose to be described hereinafter.

The upper rail member 58 is urged toward the lower rail member 42 by a tension spring 80 which is connected between an out-turned arm 82 of the upper rail member 58 and the out-turned arm 40 of the lower rail member 42. An out-turned finger 84 on the lower rail member 42 protrudes upwardly through a backwards "C"-shaped opening 86 within the upper rail member 58. The finger 84 is constructed and arranged to move the upper rail member 58 downwardly upon downward movement of the lower rail member 42. The lower rail member 42 is moved downward by contact of the arm 40 thereof by the operating arm 36 upon downward actuation thereof subsequent to the inserting of the proper coins within the openings 30 in the coin-receiving and advancing slide 31 in a manner well known in the art.

The existence of the backwards "C"-shaped opening 86 within the upper rail member 58 permits downward movement of the upper rail member by the lower rail member 42 despite pivoting of the upper rail member 58 about the upper rivet 46 as may be seen by reference to FIG. 8.

The translating member 78 which is best seen in FIG. 4, is relatively thin (see FIG. 5) and may be fashioned of any relatively strong, thin, lightweight, long-wearing material such as nylon, rigid plastic, metal or the like. The translating member 78 is a ratchet which includes, in the presently preferred and illustrative embodiment, first, second and third teeth 88, 90, 92 which protrude radially outward from the main body of the ratchet 78. As may be seen, the tooth 88 protrudes radially outward a greater distance from the center of an opening 94 in the ratchet 78 than do the teeth 90, 92, for a purpose to be described hereinafter. The tooth 88 also includes an inclined surface 96 which the teeth 90, 92 do not include, also for a purpose to be described hereinafter.

The opening 94 within the ratchet 78 is sized to fit, in a fit which permits rotation thereof relative thereto, about the middle-diameter cylindrical surface 98 of a generally cylindrical mounting hub 100 best seen in FIG. 5, for a purpose to be described hereinafter.

An initiating member or operation disc 102 is likewise relatively thin (see FIG. 5) and may be fashioned of metal or any other relatively strong material. The operation disc 102 includes an opening 104 therein which is sized to be press-fit on the smallest diameter external cylindrical surface 102 of the hub 100.

As may be noted by reference to FIGS. 5 and 6, when mounting the ratchet 78 and the operating disc 102 on the hub 100, a cupped tension washer 108 is first placed on the hub, followed by the ratchet 78 and finally followed by placing the operating disc 102 thereon and permanently affixing it by any well-known method such as by welding or peening over the right end of the hub onto the disc 102. The purpose of the cupped tension washer 108 shall be described in detail hereinafter.

The operation disc 102 includes a permanently mounted stud 110 which protrudes upwardly therefrom for a purpose to be described hereinafter; and also includes spaced circumferentially from the stud 110, two threaded openings 112, 114, also for a purpose to be described in detail hereinafter.

The hub 100 includes a central opening 116 therein which is sized to accept the exterior diameter of a shaft 118 of a timer mechanism 120 (see FIG. 3) which is constructed and arranged to initiate, in the preferred embodiment, the first cycle of an automatic washing machine. A set screw 122 aids in fixing the hub 100 and the spring 108, ratchet 78 and operation disc 102 mounted thereon on the shaft 118 in the correct angular relation thereto in a manner to be described in detail hereinafter.

It is to be understood, as noted hereinbefore, that the shaft 118, instead of being connected to a timer mechanism for initiation of the first cycle of a washing machine, can be connected to any one of numerous different operation initiators.

As may be seen by reference to FIGS. 1 through 12, and comparison thereof with FIGS. 13 through 16, and with FIGS. 17 and 18, it is possible to vary the range of permissible rotation between the ratchet 78 and the operation disc 102 to vary over less of an angular amount than that shown in FIGS. 7 through 12 by inserting a screw 124 in threaded opening 112 as may be seen by reference to FIGS. 13 through 16. As described in detail hereinafter, when the screw 124 is inserted in threaded opening 112, the hub 100 is placed on the shaft 118 at a different angular position relative thereto when compared with the arrangement of FIGS. 7 through 12 and, also as described in detail hereinafter, two actuations of the operating handle 32 are required before rotation of the shaft 118 occurs to initiate operation of the timer 120.

If the screw 124 is inserted in threaded opening 114 which the first tooth 88 abutting the stud 110 at the edge 126 of the tooth, the ratchet 78 and the operation disc 102 are immovable relative to one another rotationally and they function as a single unit. The hub 100 and the relatively fixed combination of the ratchet 78 and operation disc 102 are affixed to the shaft 118 at a still different location as described in greater detail hereinafter and a single operation of the operating handle 32 causes rotation of the shaft 118 and initiation of the operation of the timer 120 all in a manner to be described in greater detail hereinafter.

In the preferred embodiment only three teeth 88, 90, 92 are shown spaced about the periphery of the ratchet 78 permitting variation between one, two or three strokes of the operating handle 32 to initiate operation of the timer 120 in the manner to be described. Naturally, if additional teeth were added about the periphery of the ratchet 78, depending upon the length of the stroke of the upper rail 58, the radial extent of the protrusion of the teeth, and the permissible rotation of the ratchet 78 relative to the operation disc 102, further variation is possible permitting four or more strokes of the actuation member before initiation of the timer 120.

The subject invention can be factory installed on a washing machine within the case 22 of the container 20; or it may be retro-fitted to an in-operation initiating mechanism on already-installed coin-operated washing machines either in laundry centers or in washing machine rooms of multiple dwellings.

If the apparatus of the subject invention is installed on an existing coin-operated washing machine, the case 22 which is affixed to the side of the washing machine by left and right nuts 70, 72, includes upper and lower rails 58, 42 within the case, pivotally and reciprocably affixed to the case by upper and lower rivets 46, 48 which pass through the slot 50 in the upper rail member, through the slot 60 in the lower rail member and through the slot 52 in the lower rail member, all as described hereinbefore. In addition, in an existing installation the springs 54, 80 are in place and a single tooth ratchet is affixed appropriately to the shaft 118 and is constructed and arranged to be actuated by the pawl 62 of the upper rail member 58 upon a single operation of the operating handle 32 after the appropriate number of coins have been inserted within coin-receiving openings 30 within the coin-receiving and advancing slide 31 and the handle 32 is operated.

The single tooth ratchet which typically is mounted to the timer shaft 118 is generally easily removable therefrom. When it is desired to replace the single stroke original equipment actuation apparatus with the apparatus of the subject invention, the hub with the single tooth ratchet thereon is removed from the timer shaft 118 and the hub 100 of the subject invention (including the ratchet 78, the disc 102 and the washer 108) is placed on the timer shaft 118 by loosening the set screw 122 to permit receipt within the opening 116 of the timer shaft.

As may be noted by reference to FIGS. 5 and 6, the axial length of the surface 98 on the hub 100 is selected to cause the tension washer 108 to be compressed by the abutting relation of the ratchet 78 with the tension washer 108 and the placement of the operation disc 102, to cause a friction force to exist between the ratchet 78 and the operation disc 102. Because of the friction between the ratchet 78 and the operation disc 102 rotation is permitted between the ratchet and the operation disc which is less than completely free. The existence of the friction force requires some force to be exerted on the ratchet 78 to turn it relative to the operation disc 102 all for a purpose to be described in detail hereinafter.

As may be seen by reference to FIGS. 2, 3 and 7 through 12, the hub 100 including the washer 108, ratchet 78 and operation disc 102, is placed on the timer shaft 118 with the ratchet 78 above the operation disc 102. While there may or may not be a reference mark on the actual timer shaft 118, for ease of understanding of the subject invention, a reference mark has been added to the timer shaft 118 to aid in indicating the angular position of the timer shaft 118. In FIGS. 7, 8 and 9, the timer shaft 118 and the timer 120 to which it is connected are at the rest position, having rotated through a full 360° and the reference mark on the shaft is shown aligned with reference line "R" indicating the rest position for the timer 120. As may be noted by reference to FIG. 7, with the apparatus arranged as shown most clearly in FIG. 2 and FIGS. 7 through 12, the hub 100 is placed on the timer shaft 118 with the set screw 122 thereof aligned with the reference mark on the timer shaft 118 and therefore aligned with the rest reference line "R".

It should be noted that when the ratchet 78 was inserted on the hub 100 it was inserted so that the upstanding stud 110 protruded upwardly past the ratchet 78 between the surface 126 on the first tooth 88 and the surface 128 spaced circumferentially therefrom (see FIG. 7).

The shape of the operation disc 102 is shown as being a truncated disc although this is merely for convenience. Any shape of the operation disc 102 is acceptable so long as the disc does not protrude to interfere with the movement of the upper rail 58. Toward this end it should be noted that the upper rail member 58 to the left of the pawl is bent downwardly at an angle to prevent interference with the operation disc 102 (see FIG. 3).

With the hub 100 (and the ratchet 78, operating disc 102 and washer 108) mounted on the timer shaft 118 as noted hereinbefore, the ratchet 78 is rotated counterclockwise with respect to the operating disc 102 until the surface 128 of the ratchet abuts the stud 110. With no screws in the threaded openings 112, 114, the apparatus within the case 22 assumes the configuration shown in FIGS. 2, 3 and 7. As may be noted by reference to FIG. 2, spring 74 has its upper, curved end, positioned to bear against the rightmost edge of the upper rail 58 which is urged counterclockwise about the rivet 46 to the left as a result. In view of the protrusion of the out-turned finger 84 of the lower rail 42 (which is reciprocable but not pivotable in view of the rivets 46, 48 being located within slots 50, 52) protruding through the backwards "C"-shaped opening 86 in the upper rail, and in view of the rivet 46 protruding through the slot 60 in the upper rail, the upper rail 58 assumes a generally upstanding vertical attitude. This vertical attitude is further enhanced by tension spring 80 which tends to pivot the upper rail 58 clockwise about the rivet 46 in view of its being inserted through an opening in the left-hand side of the out-turned arm 82 of the upper rail member 58.

With the apparatus within the case 22 in the configuration shown in FIGS. 2, 3 and 7, when the appropriate number of coins are inserted within the coin-receiving openings 30 within the coin-receiving and advancing slide 31 accessible through the coin-receiving window 28, according to the well-known prior art apparatus within the single-direction housing 38, the operating handle 32 is moved downwardly thereby causing the operating arm 36, and in particular the lower edge thereof, to abut and move downwardly the out-turned arm 40 of the lower rail member 42 from its first, retracted upper or normal position shown in full lines in FIGS. 2 and 3 to the second, lower, extended, coin-discharge position shown in phantom in FIGS. 2 and 3.

Because of the location and configuration of the out-turned finger 84 on the lower rail 42, when the lower rail 42 moves downwardly, the out-turned finger moves downward from the upper position within the opening 86 in the upper rail 58 shown in FIG. 7 (near the top of the opening) to the bottom of the opening and the position shown in FIG. 8 thereby urging the upper rail 58 downwardly as well, as the lower rail 42 continues downwardly.

As the upper rail 58 moves from the position designated by the reference letter "*a*" in FIG. 7 downwardly, the pawl 62 on the upper rail member 58 contacts the surface 130 of the tooth 88 rotating it clockwise relative to the operation disc 102 an amount determined by the length of the stroke of the upper rail 58, the size of the pawl 62 and the radial extent and location of the surface 130 of the tooth 88 (see FIG. 8 and directional arrow "*b*").

The spring 108 and the interrelationship of the ratchet 78 and the operation disc 102 is such that the movement of the ratchet 78 by the pawl 62 is not sufficient to move the operation disc 102 which is fixed on the hub 100 which is likewise fixed to the timer shaft 118. Consequently, the rotation of the ratchet 78 by the first operation of the upper rail member 58 does not move the timer shaft 118 and does not start the timer 120.

Once the coins which had been inserted in the coin-receiving openings 30 have (by virtue of the operating handle 32 having been moved to its lowermost, coin-discharge position) dropped into the coin-receiving box 44, the handle 32 and the mechanism associated therewith including the operating arm 36 returns to the upper, first, normal position shown in full lines in FIGS. 2 and 3.

By virtue of the springs 54, 80, the upper and lower rails 56, 42 return to their normal or upper positions with the left-most edge of the pawl 62 rubbing against the outer edge of the ratchet 78 between the surface 130 of the tooth 88 and the second tooth 90 to assume the position shown in phantom in FIG. 8 adjacent the directional arrow "*c*".

The tension washer 108 and the interrelationship of the ratchet 78 and the operation disc member 102 is such that the rubbing of the left-most edge of the pawl 62 against the circumference of the ratchet during the return of the upper rail member 58 from its second, coin-discharge position, to its first, normal position, which tends to move the ratchet 78 in a counterclockwise direction, is prevented from so doing by the friction force which exists between the ratchet 78 and the operation disc 102. The ratchet 78 is then positioned as seen in FIG. 8 so that the pawl 62 can contact the second tooth 90 when the pawl is moved in the direction indicated by the directional arrow "*d*" in FIG. 9 in response to the contact of the out-turned arm 40 of the lower rail member 42 by the operating arm 36 after additional coins are inserted in the slide 31 in the manner described hereinbefore.

When the operating arm 36 has again moved to its second, lowermost, coin-discharge position and the pawl 62 has reached the second, lowermost part of its stroke, the ratchet 78, which has been contacted at its second tooth 90 by the pawl 62, has been rotated clockwise relative to the statonary operating disc 102 (see FIG. 9) until the surface 126 of the ratchet 78 has come closer to the stud 110 although the surface 126 has not contacted the stud as a result of this second operation of the handle 32.

When the operating handle 32 is released and is permitted (under the urging of the spring 54 acting on the lower rail member 42 which, in turn, acts on the operating arm 36) to move upwardly, the left-most end of the pawl 62 traverses the outer circumference of the ratchet 72 between the second tooth 90 and the third tooth 92, (and also during movement between the first tooth 88 and the second tooth 90) the upper rail member pivots clockwise to the right about the rivet 46 as may be seen by reference to FIG. 8 although contact with the circumference to the ratchet 78 is maintained by the contact of the right-most edge of the upper rail member by the curved upper end of the spring 74 as seen in FIG. 2, for a purpose to be described in detail hereinafter.

Once additional coins are placed within the coin-receiving openings 30 in the coin-receiving and advancing slide 31, and the operating handle 32 is operated and moved from its first, normal position to its second, coin-discharge position to move the upper rail member 52 and the pawl 62 to contact the third tooth 92, the ratchet 78 rotates clockwise until the surface 126 of the ratchet contacts the upstanding stud 110 protruding from the operation disc 102. By virtue of the location of the hub 100 and the manner of attachment and interrelationship thereon of the ratchet 78 and the operating disc 102, by virtue of the specific angular location of the hub on the timer shaft 118 and the size and axial location and position of the third tooth 92, as well as by virtue of the length of the stroke of the pawl 62 the stud 110 the operation disc 102 and the timer shaft 118 with respect to which the operation disc 102 is fixed, the timer shaft is rotated in a clockwise direction an amount sufficient to initiate operation of the timer 120. This rotation may be seen by reference to FIG. 10, in comparison with FIG. 9, wherein the reference mark on the end of the shaft 118 is seen to move from alignment with the "R" reference line to alignment with the "S" reference line indicating the start position of the timer 120.

Once the timer 120 has commenced operation, by virtue of the shaft 118 being moved from the "R" position to the "S" position (which may close a switch or start the timer 120 operating by any other well known means), the timer operates until it completes a cycle when the shaft 118 has rotated a full 360° and the shaft returns to the position seen in FIG. 7.

As the timer rotates, the operation disc 102 rotates therewith. By virtue of the friction force which exists between the ratchet 78 and the operation disc 102, caused by the tension washer 108, the ratchet 78 rotates along with the operation disc 102 as the timer shaft 118 rotates from the position shown in FIG. 10 until the surface 96 of the tooth 88 on the ratchet abuts the left-most edge of the pawl 62 (see FIG. 11). Upon the surface 96 of the tooth 88 abutting the left-most edge of the pawl 62, rotation of the ratchet 78 ceases as may be noted by the lack of a directional arrow thereon as seen in FIG. 11. The operation disc 102 continues rotating, as may be seen by the appearance thereon in FIG. 11 of a directional rotation arrow, under the continuous rotation action of the timer 120 and the timer shaft 118.

The timer 120 continues rotating the timer shaft 118 and the operation disc 102 fixed relative thereto, while the ratchet 78 remains stationary with the surface 96 abutting the left-most edge of the pawl 62 until the upstanding stud 110 contacts the surface 128 of the ratchet 78 as may be seen by reference to FIG. 12. Upon the stud 110 contacting the surface 128, continued rotation of the timer shaft 118 in a clockwise direction causes the operation disc 102 and the ratchet 78 to rotate together in a clockwise direction with the left-most edge of the pawl 62 moving along the inclined surface 96 of the tooth 88 causing the upper rail member 58 to pivot clockwise to the right about the rivet 46 thereby permitting continued rotation of the ratchet 78 and the operation disc 102 clockwise as a unit. The movement of the ratchet 78 and the operation disc 102 as a unit continues until the shaft 118 rotates the operation disc 102 to the rest position indicated by the reference "R" shown in FIG. 7 and the timer 120 shuts off or times out.

Once the timer shaft 118 has been rotated by the timer 120 to the position of rest indicated by the "R" and the alignment of the reference mark on the shaft therewith as shown in FIG. 7, the timer 120 has caused the washing machine or other apparatus to which it is attached to go through a complete cycle and it is reset and ready to be actuated again by three strokes of the operating handle 32 as described hereinabove.

As noted hereinbefore, during the rotation of the operation disc 102 caused by its being fixed relative to the timer shaft 118, the ratchet 78 tends to rotate clockwise due to the existence of the friction force between the ratchet 78 and the operation disc 102. The ratchet 78 is prevented from complete rotation by contact, as noted hereinbefore, with the left-most edge of the pawl 62. The upper rail member 58 of which the pawl 62 is a part, is prevented from pivoting too far clockwise about the rivet 46 by the counterclockwise force of the left-most edge of the pawl 62 on the surface 96 of the first tooth 88 applied by the curved end of the spring 74 acting against the right-most edge of the upper rail member 58 as may be seen by reference to FIG. 2. If the ratchet 78 were not partially prevented from rotating clockwise along with the operation disc 102, the position of the shaft 118 when it rotated 360° from the rest position shown in FIGS. 2 and 7 would result in the ratchet 78 being located relative to the pawl 62 so that the first actuation of the operating handle 32 would not be able to cause the pawl to contact the surface 130 of the tooth 88; and, would likely not result in the initiation of operation of the timer 120 as desired, by three operations of the operating handle 32.

In FIGS. 13 through 16, is shown an arrangement of the apparatus of the subject invention wherein two operations of the handle 32 results in initiation of the actuation of the timer 120. Specifically, as may be seen in FIG. 13, the combination of the hub 100, the tension washer 108, the ratchet 78 and the operation disc 102 are arranged relative to each other similarly to the manner of arrangement of the elements shown in FIGS. 2, 3 and 6 through 12. However, in the arrangement of FIGS. 13 through 16, a machine screw 124 is threaded into the threaded opening 112 within operation disc 102 and is selected so that at least the head thereof protrudes upwardly and outwardly from the upper surface of the operation disc 102 a sufficient amount to contact surface 128 of the ratchet 78 and prevent the passage thereover of the ratchet.

The combination of the hub 100, the tension washer 108, the ratchet 78 and the operation disc 102 is fixed to the timer shaft 118 with the screw 124 aligned with the reference mark on the timer shaft which is easily accomplished by positioning the combination on the hub properly relative to the timer shaft 118 and tightening the set screw 122. As may be noted by reference to FIG. 13, in comparison thereof with FIG. 7, the combination of the elements on the hub 100 and the hub itself, is rotated counterclockwise on the timer shaft 118 relative to the location thereof in FIGS. 7 through 12.

In the arrangement of the elements shown in FIGS. 13 through 16, after the hub 100 is placed on the timer shaft 118 with the screw 124 in the opening 112 opposite the "R" reference mark, the appropriate number of coins are inserted within the coin-receiving openings 30 within the coin-receiving and advancing slide 31. The operating handle 32 is then moved downwardly in the manner described hereinbefore with regard to the arrangement of elements shown in FIGS. 2, 3 and 6 through 12. In a similar manner, the operating handle 32, through the operating arm 36 and associated mechanism, moves the lower rail 42 downwardly which, in turn, moves the upper rail 58 downwardly so that the pawl 62 contacts the surface 130 of the first tooth 88 of the ratchet 78. This configuration of elements is shown in FIG. 14 with the directional arrow "*b*" showing the direction of movement of the pawl 62.

As may be noted by reference to FIG. 14, the ratchet 78 moves clockwise relative to its rest position shown in FIG. 13 in response to the downward movement of the upper rail 58, as may be noted by the appearance of a rotational directional arrow on the ratchet in that view. Similar to the operation of the configuration of the elements shown in FIGS. 2, 3 and 6 through 12, despite the frictional forces which exist between the ratchet 78 and the operation disc 102 (caused, at least in part, by the tension washer 108), the clockwise movement of the ratchet 78 does not move the operation disc 102. The handle 32 is released and the upper rail 58 moves to the position shown in FIG. 14 in phantom in the direction indicated by the directional arrow "c".

Additional coins are inserted within the coin-receiving openings 30 within the coin-receiving and advancing slide 31 and the operating handle 32 is again moved downwardly. Through the sequence of events and interconnection of elements described hereinbefore, the upper rail 58 moves downwardly until the pawl 62 contacts the second tooth 90 of the ratchet 78 moving the ratchet clockwise until the surface 126 contacts the stud 110 thereby moving the ratchet 78 and the operation disc 102 clockwise as may be seen by reference to FIG. 15.

Once the screw 124 which is aligned with the reference mark "R" on the timer shaft 118 is rotated an amount equal to the distance between the reference mark "R" and the reference mark "S" (as seen in FIG. 15), the timer shaft 118 to which the operation disc 102 is fixed is rotated. Rotation of the timer shaft 118, in turn, initiates operation of the timer 120.

The rotation of the ratchet 78 and the operation disc 102 together as a unit in FIG. 15 is indicated by the appearance on both of the aforementioned members of the rotational directional arrows. The operation handle 32 is then released and the upper rail member 58 returns to the first, rest, normal position shown in phantom in FIG. 15 traveling in the direction indicated by the directional arrow "e" and comes to rest as shown in full lines in FIG. 16.

As with the prior embodiment of the arrangement of the ratchet 78 and the operation disc 102 described hereinbefore, the operation disc 102 (fixed relative to the timer shaft 118) continues to rotate and, by virtue of the friction force which exists between the ratchet 78 and the operation disc 102, the ratchet rotates therewith until the surface 96 of the tooth 88 contacts the left-most edge of the pawl 62. The pawl 62, by virtue of the counterclockwise-directed force applied to the right edge thereof by the spring 74, keeps sufficient tension on the upper rail member 58 to keep the left-most edge of the pawl bearing against the surface 96 and keep the upper ratchet 78 from rotating with the clockwise-rotating operation disc 102 coaxially mounted therewith. This rotation and non-rotation is indicated in FIG. 16 by the appearance of a rotational directional arrow on the operation disc 102 and the lack of a rotational directional arrow on the ratchet 78.

The rotation of the operation disc 102 under the action of the rotating timer shaft 118, without the concurrent rotation of the ratchet 78, continues until the screw 124 contacts the surface 128 of the ratchet 78 thereby forcing the left-most edge of the pawl 62 to ride along the inclined surface 96 of the ratchet 78 and pivot clockwise about the rivet 46. The combination of the ratchet 78 and the operation disc 102 then assume the appearance shown in FIG. 13 after the timer shaft 118 has rotated a full 360° and the reference mark shown thereon has returned to alignment with the rest position indicated by "R" in the drawing figures.

With the configuration of the ratchet 78 and operation disc 102 shown in FIGS. 17 and 18, a single operation of the handle 32 is all that is required to rotate the timer shaft 118 a sufficient amount to initiate the operation of the timer 120. In the configuration of FIGS. 17 and 18, the ratchet 78 and the operation disc 102 are both placed in a position relative to one another on the hub 100 which is the same as the position they occupied in the previous two configurations shown in FIGS. 2, 3 and 6 through 12 and as shown in FIGS. 13 through 16. However, in the configuration shown in FIGS. 17 and 18, the cupped tension washer 108 can be dispensed with since, as will be noted, there is no relative rotation between the ratchet 78 and the operation disc 102. In addition, in the configuration of the ratchet 78 and operation disc 102 shown in FIGS. 17 and 18, the ratchet 78 is rotated relative to the operation disc 102 until the surface 126 of the ratchet abuts the stud 110. The screw 124 is then threaded into the threaded opening 114. The screw 124 is constructed and arranged to have the head thereof abut the surface 128 of the ratchet 78 and is sufficiently high to prevent the passage thereover of the lower surface of the ratchet.

Since the stud 110 is located with a part thereof abutting the surface 126 of the ratchet 78 and the screw 124 in the threaded opening 114 is located to abut the surface 128 of the ratchet, the ratchet is not able to rotate relative to the operation disc and the operation disc 102 and the ratchet 78 function as a single unit.

As may be noted by reference to FIG. 17, the non-movable combination of the ratchet 78 and operation disc 102 is placed with the opening 116 within the hub 100 on the shaft 118 and the combination is rotated until the screw 124 in the opening 114 is aligned with the reference mark on the shaft 118 which is aligned with the "R" reference line. By comparing the orientation of the relatively fixed ratchet 78 and operation disc 102 of FIG. 17, with the prior configurations of the relatively movable elements shown, for example in FIGS. 7 and 13, it is noted that the location of the ratchet 78 relative to the pawl 62 of the upper rail member 58 is the same in all initial positions of the ratchet and operation disc. The difference appears in the location relative to the ratchet 78 of the operation disc 102 and the orientation of the combination of the ratchet 78 and the operation disc 102 relative to the "R" reference mark.

As the appropriate number of coins are inserted in the coin-receiving openings 30 within the coin-receiving and advancing slide 31 and the operating handle 32 is moved downwardly from its first or normal position to its second or coin-discharge position, through the interconnection and interrelationship of elements noted and described hereinbefore, the pawl 62 on the upper rail member 58 moves downwardly and contacts the surface 130 of the ratchet 78, rotating it clockwise. By virtue of the interconnection noted hereinabove between the ratchet 78 and operation disc 102, as the ratchet rotates clockwise, the operation disc rotates clockwise as well an amount sufficient to move the screw 124 from the rest location indicated by "R" to the start location indicated by "S". The timer shaft 118 fixed to the combination of the ratchet 78 and the operation disc 102 is rotated clockwise as well an amount sufficient to initiate and actuate the timer 120.

The timer 120 causes the timer shaft 118 to rotate in a clockwise direction until the timer shaft has timed out and rotated a full 360°. The combination of the ratchet 78 and the operation disc 102 then have returned to the orientation shown in FIG. 17. Prior to that time, the operating handle 32 was released and has returned to its first position with consequent return and upward movement of the operating arm 36 and upward movement and return to the first position of the upper rail member 58 and the pawl 62 in the direction of the directional arrow "c" as shown in FIG. 18.

As the combination of the ratchet 78 and the operation disc 102 shown in FIGS. 17 and 18 rotates clockwise under action of the timer 120, the upper rail member 58 pivots clockwise about the rivet 46 since the left-most edge of the pawl 62 contacts the periphery of the ratchet 78. The spring 74 is selected to permit this pivoting movement without undue wear on the edge of the ratchet 78.

If it is desired, in either the two-actuation configurations of FIGS. 13 through 16 or in the single-actuation configuration of FIGS. 17 and 18, the combination of the ratchet 78 and the operation disc 102 can be arranged on the shaft 118 so that operation of the timer 120 occurs, not by contact first of the first tooth 88 but by contact first of the second tooth 90 (or in the single-actuation configuration, by contact first of the third tooth 92). However, particularly in the double-actuation configuration of FIGS. 13 through 16, it is preferrable that the first contact of the pawl 62 occur on the first tooth 88.

The reason for the preference for the first contact of the ratchet 78 by the pawl 62 occuring on the first tooth 88 is that in order for reliable, repeated operation of the subject invention, it is necessary for the combination of the ratchet 78 and the operation disc 102 to be reset from the configuration of FIG. 15 to the configuration of FIG. 13. For this resetting, it is necessary for the operation disc 102, once rotation thereof is begun, to continue rotating until it reaches the rest position "R". It is also necessary that the ratchet 78 be restrained and prevented from rotation for at least part of the cycle of rotation of the timer and timer shaft by the left-most edge of the pawl 62 restraining the ratchet 78 and partially preventing it from rotating. Since the first tooth 88 protrudes a greater radial distance from the center of the opening 94 in the ratchet 78, the contact between the left-most edge of the pawl 62 and the first tooth 88 is more positive than with either teeth 90 or 92.

If the second tooth 90 were used for commencement of the first of the two actuations which would initiate operation of the timer 120, the restraint of the ratchet 78 would not be as positive.

If all of the teeth 88, 90, 92 were of the configuration of the tooth 88, rotation of the ratchet 78 would be unduly hindered when the apparatus of the subject invention was used with less than the total number of possible actuations and one or more of the teeth had to be moved past the pawl 62 of the upper rail member 58.

What has been described is an apparatus which may either be installed as original equipment on coin-operated actuation initiating devices or which may be added, with minimal modification, to existing coin-operated actuation initiation devices capable of only single actuation operation initiation, to provide them with the capability of single, double or triple actuation of apparatus to which they are connected.

There is greater flexibility in the amount of the charge which can be made for operation of the device to which the apparatus of the subject invention is attached if the capability exists for actuating the device only after the third actuation of the coin mechanism. For example, in an apparatus designed to accept two coins, the maximum charge which can be conveniently made for a single actuation would be 50 cents in which case the coin-receiving openings 30 would each be sized to accept 25 cents in the form of a quarter. A double actuation could be used to charge $1.00 and a triple actuation could be used to charge $1.50 for the same apparatus, as costs rise.

In addition, where either 60 cents or 70 cents can be required in a two-actuation apparatus if, respectively, quarter and nickel and quarter and dime coin-receiving openings 30 are provided within the coin-receiving and advancing slide plate 31, with the subject invention arranged for three actuations, each one being operated in response to 25 cents in the form of a quarter being inserted, 75 cents can be charged for the initiation of the operation of the device.

Thus, greater flexibility is provided by the apparatus of the subject invention then was previously available and the flexibility is provided by apparatus which is economical to manufacture and install and which is reliable in operation.

As will be readily apparent to those skilled in the art, the invention may be used in other specific forms including, without limitation, in forms requiring a greater number of actuations than three, and may be used for the initiation of the actuation of other than the timer of the illustrative embodiment without departing from the spirit or essential characteristics of the subject invention. The present embodiment is, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. An apparatus for translating a predetermined number of operations of an actuation member into initiation of operation of a device, said apparatus comprising: a translating member and an initiating member; said translating member being a ratchet having at least first and second teeth thereon, said initiating member being a disc mounted for movement relative to said ratchet, said actuation member including a pawl; said translating member being mounted in operative relation to said actuation member and including means being constructed and arranged for movement of said translating member a predetermined amount in a given direction as a result of operation of said actuation member; means mounting said initiating member in operative relation to said translating member; coupling means for causing movement of said initiating member upon movement of said translating member in said given direction an amount greater than said predetermined amount; commencement means in operative relation to said initiating member and in operative relation to said device for initiating operation of said device upon said movement of said initiating member; said actuation member, said ratchet and said disc being constructed and arranged relative to one another and relative to said pawl, so that upon operation thereof from a first to a second position, said pawl engages one of said teeth on said ratchet and moves said ratchet in said given direction said predetermined amount, said disc including means being constructed and arranged so that said disc does not contact said pawl upon movement thereof to engage said teeth.

2. An apparatus for translating a predetermined number of operations on an actuation member into initiation of operation of a device, said apparatus comprising: a translating member being a ratchet having at least first and second teeth spaced circumferentially thereabout, and an initiating member being a disc; said translating member being mounted in operative relation to said actuation member and including means being constructed and arranged for movement of said translating member a predetermined amount in a given direction as a result of operation of said actuation member; means mounting said initiating member in operative relation to said translating member; coupling means for causing movement of said initiating member upon movement of said translating member in said given direction an amount greater than said predetermined amount; commencement means in operative relation to said initiating member and in operative relation to said device for initiating operation of said device upon movement of said initiating member; said actuation member including a pawl and being mounted for moving said ratchet in said given direction upon operation thereof and said pawl contacting a tooth of said ratchet, said ratchet and said disc being mounted coaxially for rotation relative to one another, means being constructed and arranged for permitting movement of said ratchet and said disc relative to one another both in said given direction and in a direction opposite to said given direction, said last-named means being constructed and arranged relative to said disc and said ratchet to cause said ratchet and said disc to move together in said given direction after said ratchet being moved an amount sufficient to move said initiating member.

3. The apparatus according to claim 2, said first tooth including means being constructed and arranged for coacting with said pawl for ensuring alignment of said first tooth with said pawl to permit movement of said initiating member only after movement of said translating member in said given direction an amount greater than said predetermined amount.

4. Apparatus for translating a predetermined number of operations of an actuation member into initiation of operation of a cyclically operating device, said apparatus comprising: a translating member and an initiating member; said translating member being a ratchet and said initiating member being a disc, said translating member being mounted in a first position in operative relation to said actuation member and including means being constructed and arranged for movement of said translating member a predetermined amount in a given direction as a result of operation of said actuation member; means coaxially mounting said initiating member in a first position in operative relation to said translating member; coupling means for causing movement of said initiating member from said first position only upon movement of said translating member in said given direction an amount greater than said predetermined amount; commencement means in operative relation to said initiating member and in operative relation to said device for initiating operation of a cycle of said device upon movement of said initiating member from said first position; means for ensuring return of said translating and said initiating members to said first positions; said coupling means causing rotation of said disc in said given direction upon said ratchet having been rotated an amount in said given direction greater than said predetermined amount; said apparatus means for causing said ratchet and said disc to move together in said given direction through at least part of the cycle of operation of said device.

5. The apparatus according to claim 4, said ratchet including at least first and second teeth, said first tooth including means being constructed and arranged for preventing movement of said ratchet in said given direction for at least part of the movement of said disc during the cycle of operation of said device thereby aiding in return of said ratchet to said first position upon completion of said cycle.

6. An apparatus for translating a plurality of operations of an actuation member into initiation of operation of a timer, said apparatus comprising: a ratchet having a plurality of teeth spaced about the periphery thereof; an initiating disc; means mounting said ratchet and said disc coaxially relative to each other, and fixing said disc relative to a timer initiating member; means mounting said ratchet so that said teeth can be contacted and said ratchet rotated by a pawl on said actuation member; said pawl said actuation member and said ratchet being constructed and arranged so that operation of said actuation member causes said pawl to rotate said ratchet in a given direction a predetermined amount upon said actuation member being moved from a first position to a second position; coupling means for causing rotation of said disc in said given direction upon rotation of said ratchet in said given direction an amount greater than said predetermined amount thereby initiating operation of said timer; said apparatus including means causing said ratchet and said disc to rotate together in said given direction subsequent to initiation of operation of said timer for at least part of the cycle of operation thereof; one of said plurality of teeth of said ratchet including means being constructed and arranged for contacting said pawl and preventing rotation of said ratchet in said given direction for at least part of the cycle of operation of said timer.

7. Apparatus for translating a predetermined number of operations of a reciprocating actuation member into initiation of operation of a cyclic timer device by initiating rotation of a shaft thereof, said apparatus comprising: a ratchet member rotatably mounted relative to said shaft including a plurality of teeth; a disc member coaxially mounted relative to said ratchet and coaxially mounted to said shaft; means mounting said ratchet relative to said actuation member so that a pawl of said actuation member can contact a tooth of said ratchet member and thereby cause said ratchet to rotate a given amount in a given direction; coupling means for causing movement of said disc upon movement of said ratchet member in said given direction an amount greater than said given amount thereby causing rotation of said shaft and commencing operation of a cycle of said timer; means for causing simultaneous rotation of said ratchet and said disc in said given direction during at least part of the operation of said timer; at least one of said teeth including means for use in preventing rotation of said ratchet in said given direction for at least part of the operation of said timer.

* * * * *